United States Patent [19]

Kanesaka

[11] Patent Number: 5,303,686
[45] Date of Patent: Apr. 19, 1994

[54] METHOD OF PURIFYING EXHAUST GASES OF AN OTTO-CYCLE ENGINE

[75] Inventor: Hiroshi Kanesaka, Kawasaki, Japan

[73] Assignee: Kabushiki Kaisha Kanesaka Gijitsu Kenkyusho, Japan

[21] Appl. No.: 973,766

[22] Filed: Nov. 9, 1992

[30] Foreign Application Priority Data

Nov. 13, 1991 [JP] Japan .................................. 3-325225

[51] Int. Cl.⁵ .......................... F02M 25/07; F01N 3/20
[52] U.S. Cl. ........................................ 123/568; 60/278; 60/285
[58] Field of Search ...................... 123/90.6, 316, 568, 123/569; 60/278, 285

[56] References Cited

U.S. PATENT DOCUMENTS

| | | | |
|---|---|---|---|
| 3,298,332 | 1/1967 | Elsbett | 123/90.6 X |
| 3,507,261 | 4/1970 | Myers et al. | 123/568 |
| 4,357,917 | 11/1982 | Aoyama | 123/568 X |
| 4,424,790 | 1/1984 | Curtil | 123/90.6 X |
| 4,700,684 | 10/1987 | Pischinger et al. | 123/568 |
| 4,732,116 | 3/1988 | Tanahashi et al. | 123/568 X |
| 5,201,173 | 4/1993 | Fujimoto et al. | 60/278 |

Primary Examiner—Willis R. Wolfe
Attorney, Agent, or Firm—Anthony J. Casella; Gerald E. Hespos

[57] ABSTRACT

Exhaust gases are caused to flow back into the cylinders of an Otto-cycle engine through exhaust valves when the pistons stay at the bottom dead centers of the induction stroke. This enables the exhaust gases leaving the cylinder during the exhaust stroke to have a sufficiently high temperature to activate a catalyst for purifying the exhaust gases even when the engine still has a low temperature during the beginning of its operation at a low load.

4 Claims, 5 Drawing Sheets

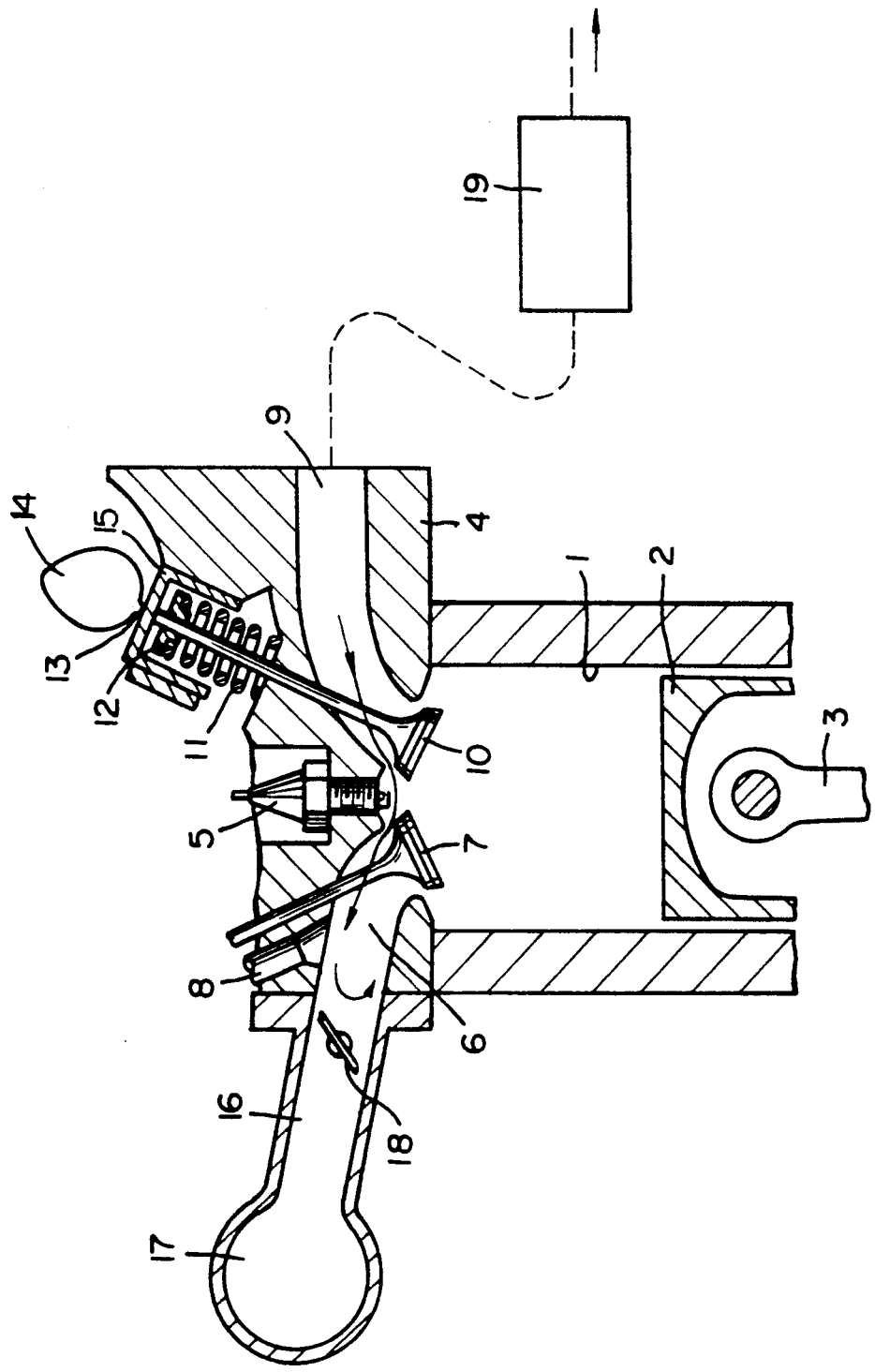

METHOD OF PURIFYING EXHAUST GASES OF AN OTTO-CYCLE ENGINE

BACKGROUND OF THE INVENTION

1. Field of the Invention

This invention relates to a method of purifying the exhaust gases of an Otto-cycle engine.

2. Description of the Prior Art

A ternary catalyst is employed for purifying the exhaust gases of a known Otto-cycle engine by dissociating their harmful constituents, such as $NO_x$, CO and HC, and converting them to N, $O_2$, $CO_2$ and $H_2O$. When the engine has a low cooling water temperature and a low output, however, the loss of heat disables the exhaust gases to reach a temperature of 450° C., and as a consequence, the catalyst loses its activity and allows the harmful substances to be discharged to the atmosphere.

As the low temperature of the exhaust gases is due to the low temperature of the exhaust manifold and pipes of the engine, it has been proposed that the exhaust manifold and pipes be insulated against any substantial loss of heat, or that the exhaust manifold be formed from steel pipes having a smaller wall thickness and therefore a smaller heat capacity, so that it may obtain an elevated temperature more quickly. Neither of these approaches can, however, be expected to produce any satisfactory result, since they are not positive means for raising the temperature of the exhaust gases.

It has also been proposed that the catalyst be positioned immediately after the exhaust manifold, so that the loss of heat occurring to the exhaust gases may be reduced. This approach cannot be expected to produce any satisfactory result, either, but is rather likely to have an adverse effect on the output and thermal efficiency of the engine, since the catalyst adds to the resistance to the flow of the exhaust gases with a resultant increase in the fuel consumption of the engine.

It has further been proposed that a metallic support be used for a metallic catalyst, and supplied with electricity to heat and activate the catalyst. This approach is, however, not practical, since it calls for the use of a large amount of electricity.

As a matter of fact, there is actually no catalyst that can be activated at a temperature which is as low as about 300° C., but it is actually the case that the exhaust gases which are produced by any such engine when it has a low cooling water temperature and a low output, are discharged without being satisfactorily purified.

SUMMARY OF THE INVENTION

Under these circumstances, it is an object of this invention to provide a method for the purification of exhaust gases of an Otto-cycle engine which can satisfactorily raise the temperature of the exhaust gases and activate a catalyst to purify the exhaust gases effectively and reduce $NO_x$ from the gases to be exhausted, even during the beginning of engine operation when the engine still has a low temperature and is operating at a low load.

This object is attained by a method which comprises causing the exhaust gases of an Otto-cycle engine to flow back into its cylinders through exhaust valves when the pistons stay at the bottom dead centers during the induction stroke of the engine.

The exhaust gases flowing back into the cylinders raise the temperature of gases in the cylinders by heating them, as well as by increasing their pressure. This enables the engine to maintain a satisfactorily high temperature throughout the subsequent compression and expansion strokes thereof and thereby exhaust gases having a satisfactorily high temperature.

These and other features and advantages of this invention will become more apparent from the following description and the accompanying drawings.

BRIEF DESCRIPTION OF THE DRAWINGS

FIG. 4 is a view similar to FIG. 1, but showing the intake valve in its open position.

DETAILED DESCRIPTION OF THE INVENTION

Figure 1:
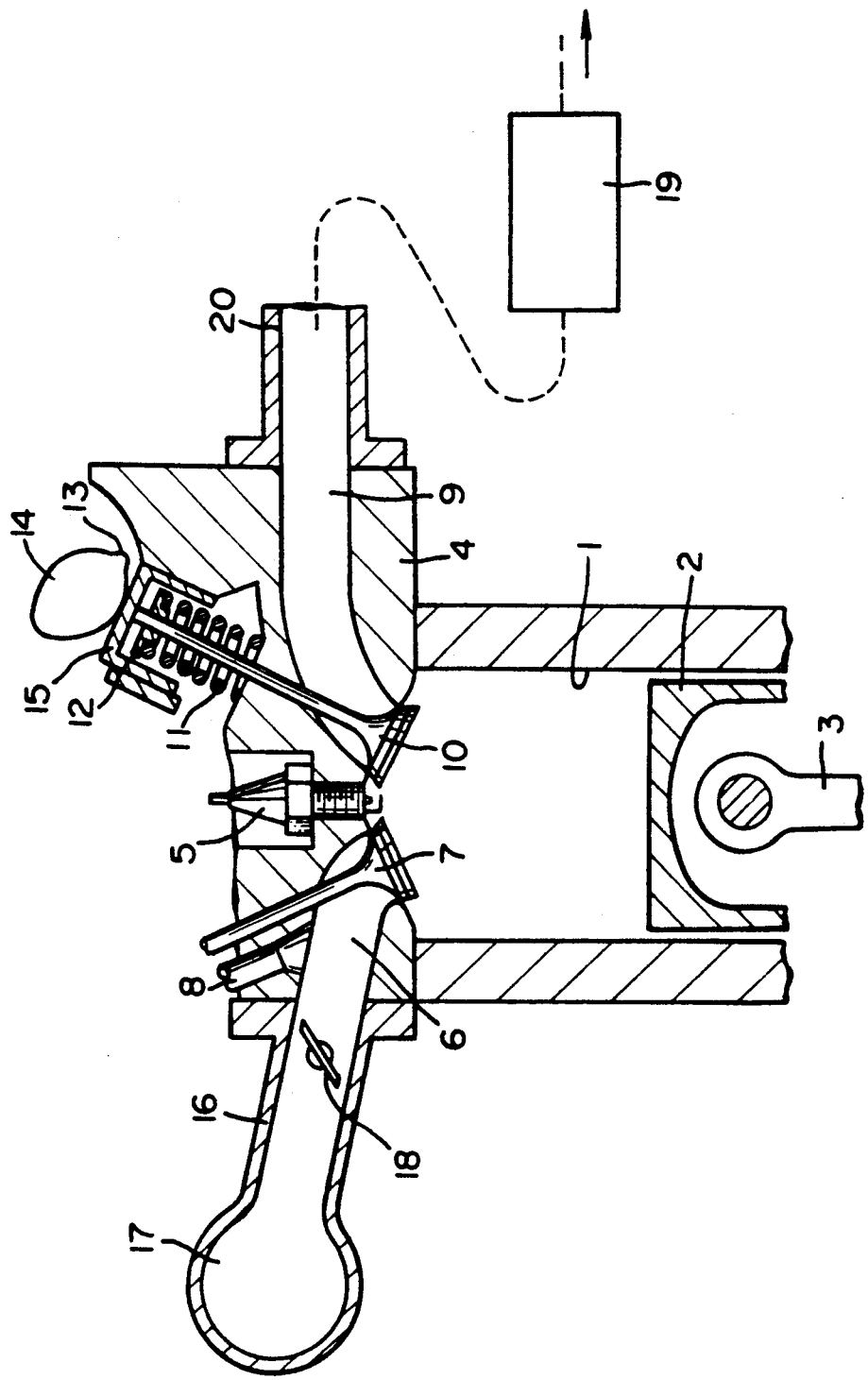
FIG. 1 is an elevational view, partly in section, of a cylinder of an Otto-cycle engine in which a method embodying this invention is carried out, with an intake valve shown in its closed position.

Reference is first made to FIG. 1 showing the basic construction of a four-stroke Otto-cycle engine in which a method embodying this invention is carried out. Although it is a multicylinder engine, the drawing shows only one of its cylinders. The cylinder 1 contains a slidable piston 2 which is connected by a connecting rod to a crankshaft not shown to impart a rotary motion to it. A spark plug 5 is installed in a cylinder head 4, and directed coaxially with the cylinder 1. The cylinder has an intake port 6 provided with an intake valve 7 and a fuel injection valve 8, and an exhaust port 9 provided with an exhaust valve 10. The exhaust valve 10 is provided at its outer end with a spring seat 12 acted upon by a valve spring 11, and a tappet 15 moved by a cam 14 having an auxiliary cam 13 and thereby moving the exhaust valve 10.

Figure 5:
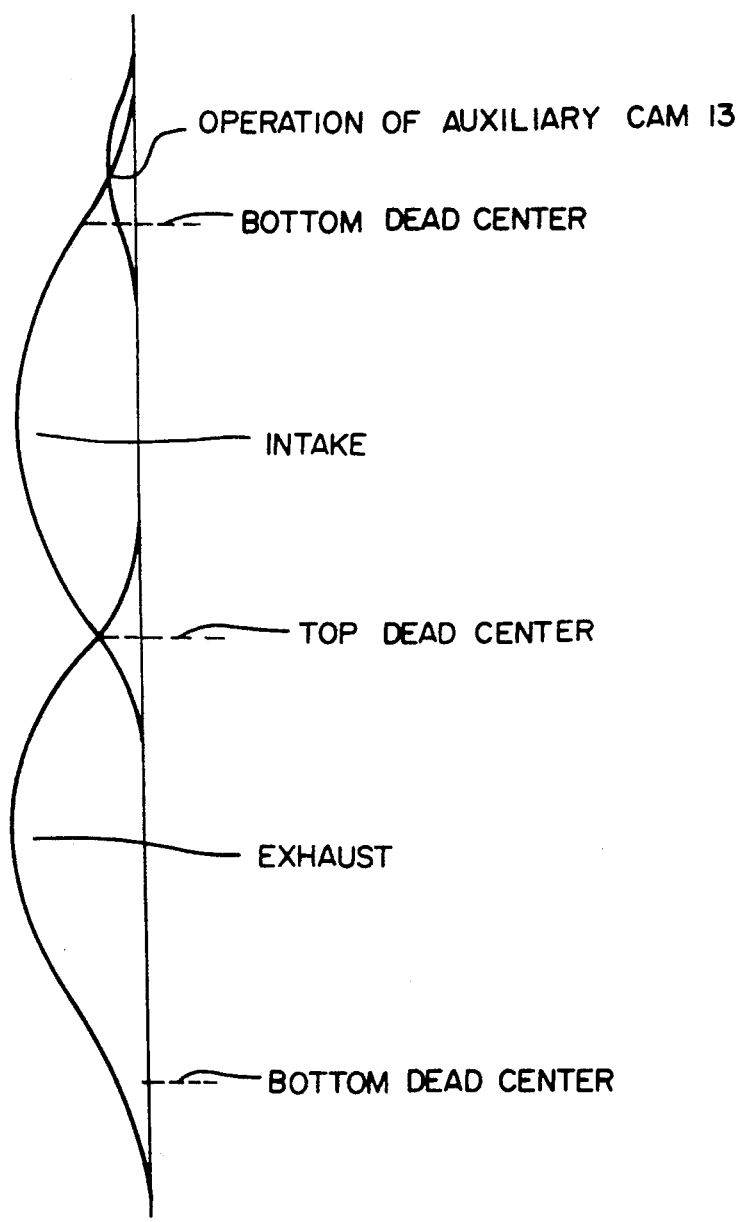
FIG. 5 is a diagram illustrating the method embodying this invention.

The spark plug 5 is synchronized in operation with the crankshaft of the engine, and the intake and exhaust valves 7 and 10 are also synchronized in operation with the crankshaft to be opened and closed by a known mechanism as frequently as the valves in any ordinary engine are. The auxiliary cam 13 is designed for acting upon the tappet 15 to open the exhaust valve 10 and allow exhaust gases to flow back into the cylinder 1 for a certain period of time from somewhat before the piston reaches the bottom dead center of its induction stroke, to somewhat after the end of its induction stroke, as shown in FIG. 5.

An intake pipe 16 has one end connected to the intake port 6, and the other end connected to an intake manifold 17. A throttle valve 18 is installed in the intake pipe 16 and the degree to which it is opened depends on the output required of the engine. An exhaust manifold 20 is connected to the exhaust port 9, and a catalyst 19 for purifying exhaust gases is positioned downstream of the exhaust manifold 20.

Description will now be made of the method embodying this invention and used for purifying the exhaust gases of the Otto-cycle engine as hereinabove described. When the engine is operated at a high load, the throttle valve 18 is nearly fully opened, and during the induction stroke of the engine, the intake valve 7 is opened to admit air having a nearly atmospheric pressure and a corresponding amount of gasoline into the intake port 6 and the cylinder 1 through the intake pipe 16 and the fuel injection valve 8. The resulting mixture of air and gasoline flows into the cylinder 1, and as it raises the pressure prevailing in the cylinder 1 to a level not greatly differing from that prevailing in the exhaust port 9, the cylinder 1 does not permit a large amount of exhaust gases to flow back, even if the exhaust valve 10 is opened by the action of the auxiliary cam 13 when the piston has approached the bottom dead center of its induction stroke.

During the beginning of engine operation when the engine does not yet have an exhaust gas temperature which is sufficiently high for activating the catalyst, it has hitherto been usual to restrict the opening of the throttle valve 18 to limit the amount of the fuel-and-air mixture which is admitted into the cylinder 1. Description will be made of the conventional sequence of engine operation with reference to FIG. 2. The induction stroke is started at a point p1 at which the pressure prevailing in the cylinder 1 is lower than atmospheric pressure, and the compression stroke is started at p2. The pressure prevailing in the cylinder 1 becomes equal to atmospheric pressure at p2a. The volume of the fuel-and-air mixture occupying the cylinder 1 at p2a is shown as $a$ in FIG. 2. The compression stroke ends at p3. The fuel-and-air mixture is ignited by the spark plug 5, and the gases of combustion raise the pressure prevailing in the cylinder 1 to a level shown at p4. The expansion stroke starts at p4 and ends at p5. Then, the exhaust valve 10 opens to start the exhaust stroke. The pressure prevailing in the cylinder 1 drops to a level close to atmospheric pressure as shown at p6, and the exhaust stroke ends at p7.

Figure 2:
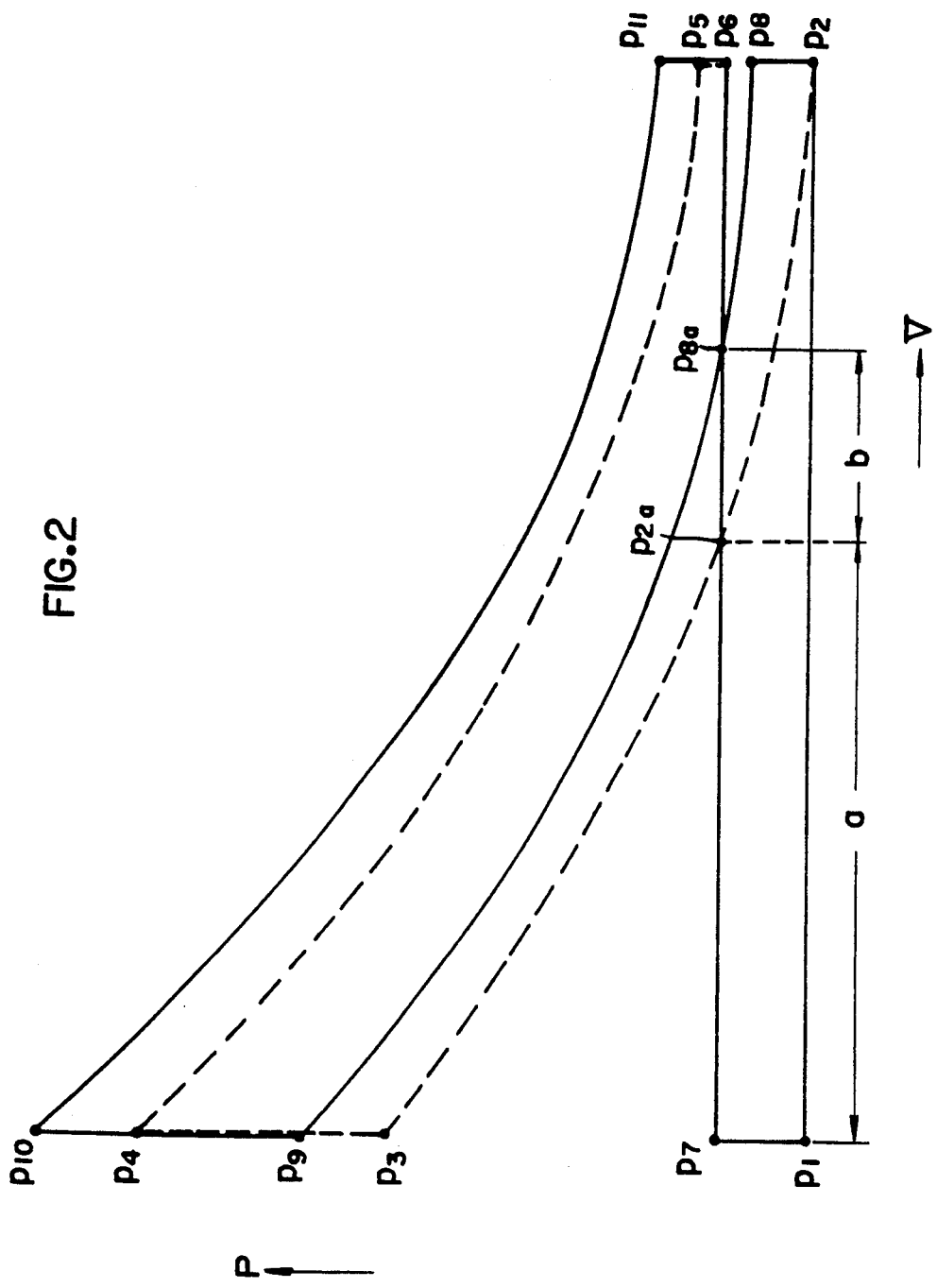
FIG. 2 is a P-V diagram employed for describing the method embodying this invention.
Figure 3A:
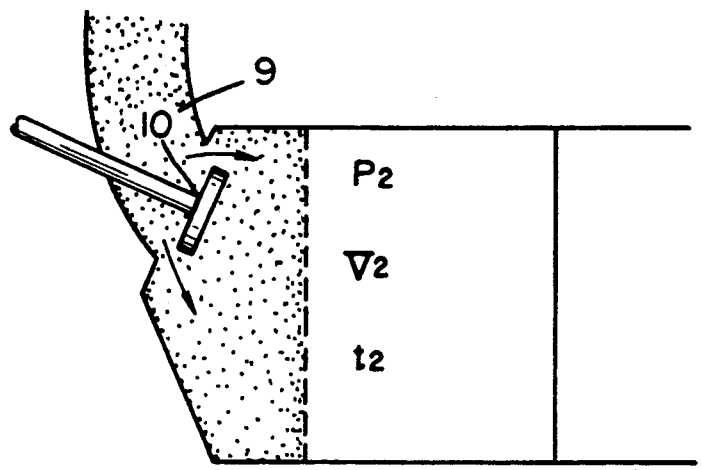
FIG. 3a is a diagrammatic view showing the conditions of a fuel-and-air mixture in the cylinder into which exhaust gases have been caused to flow back in accordance with the method embodying this invention.
Figure 3B:
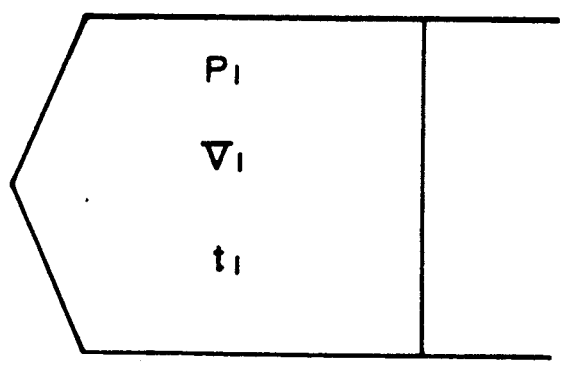
FIG. 3b is a view similar to FIG. 3a, but showing the conditions prevailing before the back flow of exhaust gases into the cylinder.

FIG. 2 also shows the sequence of engine operation which takes place when the method embodying this invention is employed. As far as the induction stroke is concerned, it is started as hereinabove described. When the piston has arrived at the bottom dead center p2 of its induction stroke, however, the exhaust valve 10 is opened by the auxiliary cam 13 to allow exhaust gases to flow back from the exhaust port 9 having atmospheric pressure to the cylinder 1 having a negative pressure. Before the exhaust gases flow back into the cylinder 1, the fuel-and-air mixture in the cylinder 1 has a pressure $P_1$ which is lower than atmospheric pressure, a volume $V_1$ which is equal to the displacement of the cylinder 1, and a temperature $t_1$, as shown in FIG. 3b. If the exhaust gases flow back into the cylinder 1, the fuel-and-air mixture is thereby compressed and heated, and has a smaller volume $V_2$, a higher pressure $P_2$ close to atmospheric pressure, and a higher temperature $t_2$, as shown in FIG. 3a. When the engine has a low cooling water temperature during the beginning of its operation, the exhaust gases flowing back into the cylinder 1 have a temperature of about 300° C., but the mixture thereof with the compressed fuel-and-air mixture has a higher temperature at p8 in FIG. 2. The compression of the mixture is started at p8 and its pressure becomes equal to atmospheric pressure at p8a. The volume of the exhaust gases which have flowed back into the cylinder 1 is shown as $b$ in FIG. 2.

As the compression stroke is started at p8 at which the mixture has a higher pressure and a higher temperature than at p2, the compressed mixture has a higher pressure and a higher temperature at the top dead center p9 of the compression stroke than at p3. The mixture is ignited by the spark plug 5 and the gases of combustion raise the pressure prevailing in the cylinder 1 to a level p10. The expansion stroke starts at p10 and ends at p11. The expanded gases naturally have a temperature which is higher than what has hitherto been obtained, and the exhaust gases, therefore, have a sufficiently high temperature for activating the catalyst.

The exhaust gases staying in the exhaust port immediately after their discharge from the cylinder are known as a radical, and a highly active and effective combustion promotor. It is known that a fuel-and-air mixture burns well in a two-stroke gasoline engine, even if it may be mixed with a large amount of exhaust gases. Thus, there does not occur any trouble in combustion, even if a large amount of exhaust gases may be caused to flow back into the cylinder in accordance with the method of this invention.

As it is a negative pressure prevailing in the cylinder 1 that causes the exhaust gases to flow back into it, a large amount of exhaust gases flow back with a resulting production of exhaust gases having a high temperature when the cylinder has a high negative pressure during the operation of the engine at a low load with a low exhaust gas temperature. The cylinder 1 has a lower negative pressure with an increase in load, and a smaller amount of exhaust gases, therefore, flow back into the cylinder. When the throttle valve is fully open for engine operation at a full load, the pressure prevailing in the cylinder 1 is nearly equal to atmospheric pressure and substantially no exhaust gases flow back into the cylinder. Thus, the engine in which the method of this invention is employed is comparable to any known engine in the amount of the fuel-and-air mixture drawn into the cylinders, and therefore in its output. The reduction which an increase in load brings about in the amount of exhaust gases which flow back does not have any adverse effect on the activity of the catalyst 19, since the increase in load results in a higher exhaust gas temperature, as in any known engine.

The Otto-cycle engine in which the method of this invention is employed is intended for producing a high speed output. Therefore, the intake valve 7 remains open even when the piston has arrived at the bottom dead center of its induction stroke and the exhaust valve 10 is opened by the auxiliary cam 13, as shown in FIG. 4. If the engine, therefore, had only one throttle valve located at one end of the intake manifold, as is the case with a known engine, a part of exhaust gases flowing back from the exhaust port 9 would not stay in the cylinder 1, but would flow through the intake pipe 16 into another cylinder operating under the induction stroke, as shown by an arrow in FIG. 4. As a matter of fact, it has been confirmed that the exhaust gases flowing into the intake pipe and manifold fail to compress the fuel-and-air mixture in the cylinder 1 effectively, as well as losing their radical property while flowing through the intake pipe and manifold, and disable the full advantage of this invention to be obtained. Therefore, the multicylinder engine in which the method of this invention is employed has a throttle valve 18 in each intake pipe 16 to prevent exhaust gases entering the intake port 6 from flowing into the region upstream of the throttle valve 18 in which atmospheric pressure prevails, and thereby ensure that the exhaust gases flowing back from the exhaust port 9 stay in the cylinder 1 and compress the fuel-and-air mixture effectively.

What is claimed is:

1. A method for efficiently heating a catalyst with exhaust gas from an Otto-cycle engine, said Otto-cycle engine having at least one cylinder with a piston disposed for reciprocating movement between a top dead center position and a bottom dead center position in said cylinder, an intake port for delivering fuel and air to said cylinder, an intake valve for selectively opening and closing said inlet port, a spark plug for igniting the fuel and air in the cylinder, an exhaust port extending from said cylinder to said catalyst for enabling a flow of exhaust gas substantially at atmospheric pressure to said catalyst and an exhaust valve for selectively opening and closing said exhaust port, said method comprising the steps of:

moving said piston toward said bottom dead center position, while closing said exhaust valve and opening said intake valve sufficiently for inducting fuel and air into said cylinder and for achieving below-atmospheric pressure in said cylinder;

opening said exhaust valve when said piston reaches said bottom dead center position for drawing exhaust gas away from said catalyst, through said exhaust port, and into said cylinder for increasing pressure and temperature in said cylinder;

closing said intake valve and said exhaust valve and moving said piston toward said top dead center position for further increasing pressure and temperature in said cylinder;

igniting said gases in said cylinder with said spark plug to drive said piston toward said bottom dead center position;

opening said exhaust valve and moving said piston toward said top dead center position for driving the heated exhaust gas through said exhaust port and to said catalyst, whereby the drawing of said exhaust gas away from said catalyst, through said exhaust port, and into said cylinder when said piston reaches said bottom dead center position increases temperature of gases in said cylinder and accelerates heating of said catalyst for more efficient purification of exhaust gases from said Otto-cycle engine.

2. A method as set forth in claim 1, wherein the engine has a throttle valve installed in each intake pipe.

3. A method as set forth in claim 1, wherein said exhaust valves are each opened by an auxiliary cam.

4. A method as set forth in claim 3, wherein the engine has a throttle valve installed in each intake pipe.

* * * * *